United States Patent [19]
Arsenault et al.

[11] Patent Number: 6,042,472
[45] Date of Patent: Mar. 28, 2000

[54] METHOD AND APPARATUS TO CONTROL AIR DISTRIBUTION DOORS IN AN AIR HANDLING SYSTEM

[75] Inventors: Jeffrey S. Arsenault, Plymouth; Mark David McBroom, Redford, both of Mich.

[73] Assignee: Ford Motor Company, Dearborn, Mich.

[21] Appl. No.: 09/037,661

[22] Filed: Mar. 10, 1998

[51] Int. Cl.[7] ...................................................... B60H 1/26
[52] U.S. Cl. ............................................. 454/69; 454/121
[58] Field of Search ........................... 454/69, 121, 126, 454/156, 159, 160, 161

[56] References Cited

U.S. PATENT DOCUMENTS 4,356,966  11/1982  Kado .................................. 454/161 X
4,762,169   8/1988  Andersen et al. .
4,844,150   7/1989  Nakazawa .
5,016,704   5/1991  Ono .
5,338,249   8/1994  Hildebrand et al. ................ 454/121 X
5,582,234  12/1996  Samukawa et al. .

FOREIGN PATENT DOCUMENTS 125976  11/1984  European Pat. Off. .

Primary Examiner—Harold Joyce
Attorney, Agent, or Firm—James J. Dottavio

[57] ABSTRACT

An air handling system includes at least two doors to control the flow of air to achieve a selected mode. A first door travels through a first path, and a second door travels through a second path which intersects the first path. A first final position is determined for the first door and a second final position is determined for the second door to achieve the selected mode. It is determined whether the two doors will collide when traveling to the respective final door positions and it is determined whether both doors could be closed simultaneously while rotating to the final positions. A relief door is maintained at a partially open position.

20 Claims, 2 Drawing Sheets

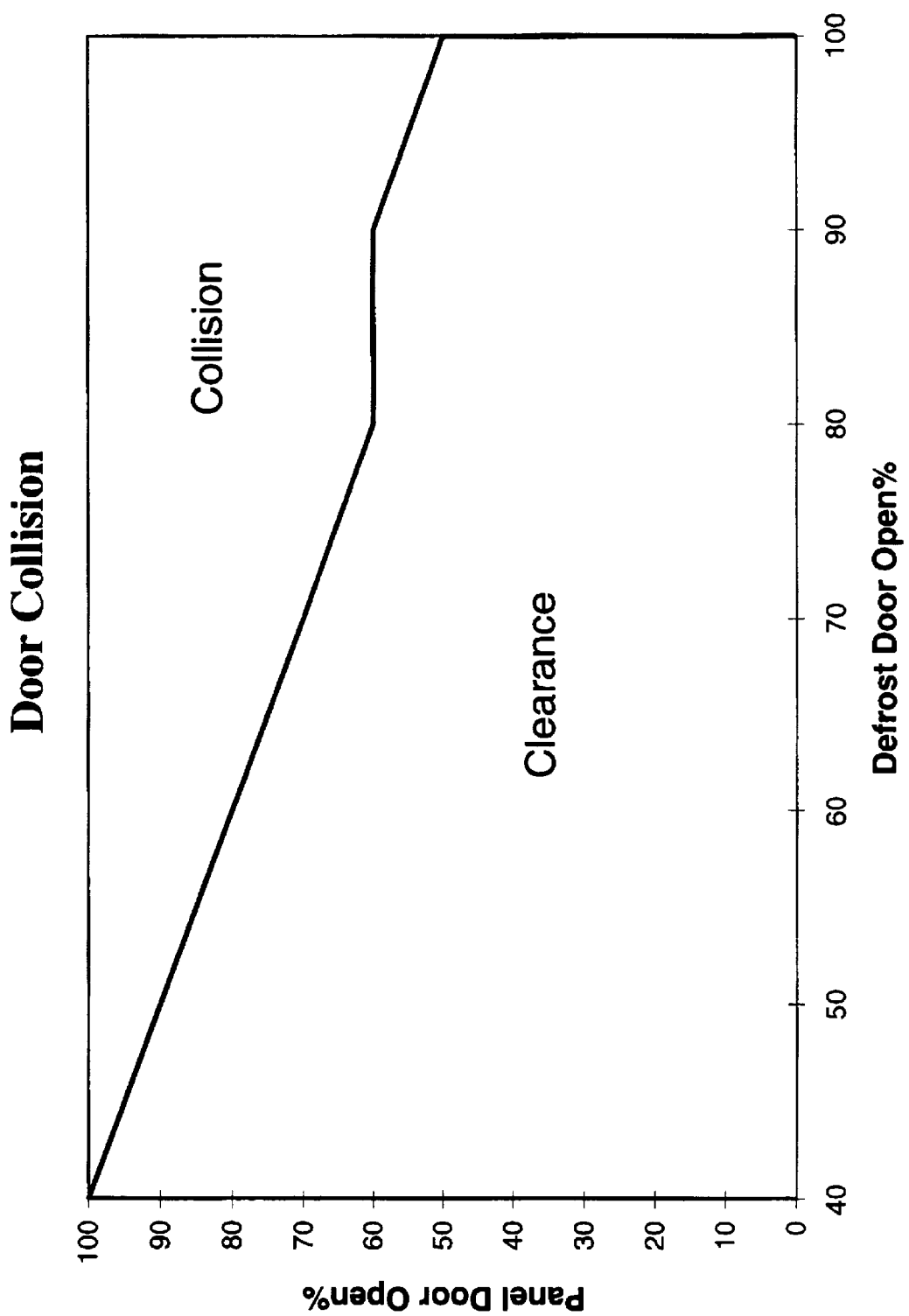

METHOD AND APPARATUS TO CONTROL AIR DISTRIBUTION DOORS IN AN AIR HANDLING SYSTEM

FIELD OF THE INVENTION

The present invention is related to a system and method for controlling air distribution doors in an HVAC system in a motor vehicle.

BACKGROUND OF THE INVENTION

Within the air handling system of a motor vehicle, it is desirable to minimize the size of the components and the space which they occupy. In EP Patent 125976-A to Rena, an air handling system is shown which provides only two doors to control the flow of air to the floor, to the defroster, and to the panel. The two doors swing through arcs of rotation having intersecting paths. To avoid a collision between the two doors, which travel through the same space, the doors are interconnected with a linkage system to prevent a collision.

The arrangement of the Rena patent requires a linkage which limits the modes in which the system may operate and does not provide the same flexibility of a three door design. Both doors of Rena may be placed in a closed position simultaneously. If the third opening were closed off, an objectionable noise would occur.

It would therefore be desirable to provide an air handling system which occupies a minimal amount of space and which does not require a linkage to interconnect the doors to avoid a collision. It would be further desirable to prevent objectionable noises in the system.

SUMMARY OF THE INVENTION

It is an object of the present invention to provide an air handling system which occupies a minimal amount of space and which does not require a linkage to interconnect the doors to avoid a collision. It is a further object of the present invention to prevent all doors from closing and presenting a noise problem. It is a further object to provide such a system which provides additional doors to maximize the functionality of the air handling system.

An apparatus and method are described to control the air distribution doors in an air handling system of a motor vehicle. The air handling system includes at least two doors to control the flow of air to achieve a selected mode. A first door travels through a first path, and a second door travels through a second path which intersects the first path. A first final position is determined for the first door and a second final position is determined for the second door to achieve the selected mode. It is determined whether the two doors will collide when traveling to the respective final door positions and it is determined whether both doors could be closed simultaneously while rotating to the final positions. A relief door is maintained at a partially open position.

BRIEF DESCRIPTION OF THE DRAWINGS

FIG. 3 is a chart illustrating the relationship of the defrost door opening to the panel door opening and where a collision of the doors would occur.

DETAILED DESCRIPTION OF PREFERRED EMBODIMENTS

Figure 1:
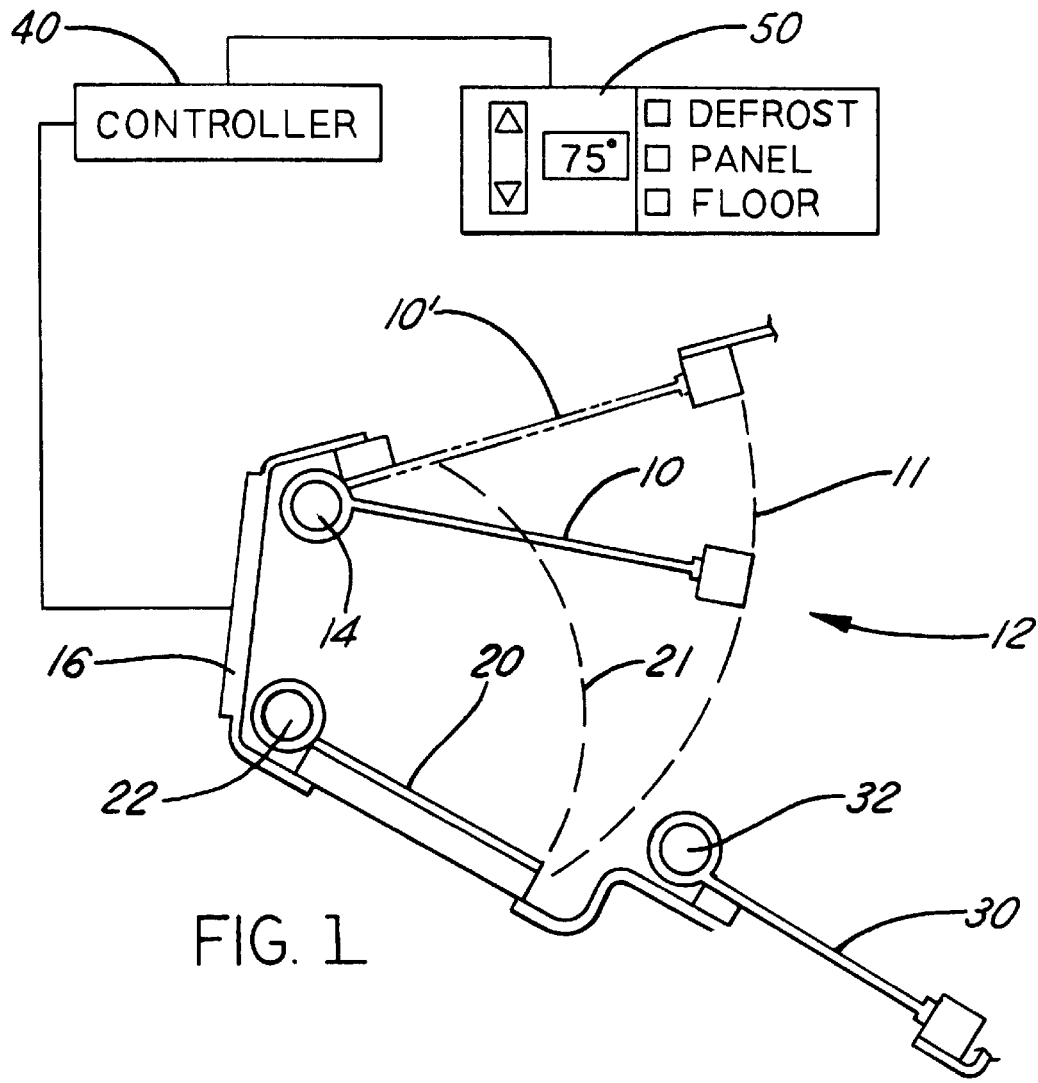
FIG. 1 is a partial sectional view of an air distribution box of a motor vehicle according to the present invention.
Figure 2:
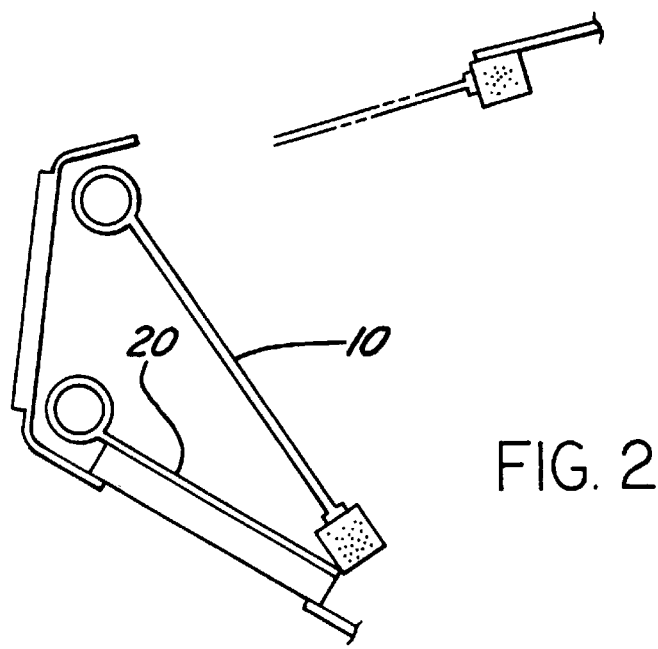
FIG. 2 is a partial sectional view of the air distribution box shown in FIG. 1 with one of the doors shown in a second position.

As shown in FIG. 1, an air distribution box 12 of an HVAC system of a motor vehicle is provided. The air distribution box assembly includes a plurality of doors 10, 20, 30 for directing air toward the floor, instrument panel, and defroster of the interior compartment of a motor vehicle. Each of the doors rotates about an axis 14, 22, 32, and is rotated by a motor (not shown) to one or more positions. Two of the doors 20, 30 are shown in a closed position in FIG. 1, while the third door 10 is shown in a partially open position. The third door 10 is also shown in phantom in a closed position. The arcs 11, 21 representing the path of travel for the doors 10, 20 are shown in dashed lines.

The air handling system of the present invention is configured such that one could physically close all three doors 10, 20, 30 at the same time. The present invention does not permit all three doors to close at the same time, as this would present an undesirable situation. If all three doors were closed, air blown by a blower motor (not shown) would not be able to properly escape the box, and would cause a whistling noise. Such whistling noises are be highly objectionable in a motor vehicle. To prevent this situation, in a preferred embodiment, at least one of the doors is partially open at all times, and preferably open a minimum of 50%. In an alternative embodiment, either one door is open a minimum of 50% or two doors are open a minimum of 25%. One skilled in the art recognizes the amount a particular door must be left open depends on the amount of air blown by the motor, the size of the door opening, and the path of the door travel.

The term above of "50%" open refers to a position wherein the door is open so 50% of the air flow achieved when the door is fully opened is attained. One skilled in the art recognizes this opening is selected for the particular configuration used here and each HVAC system may use different percentage openings to create a system which performs to the intent of the present invention so the system does not whistle when all of the doors are closed, and so the doors do not collide.

As illustrated in FIG. 1, the first and second doors 10, 20 rotate through arcs 11, 21, respectively. Because the paths of travel, represented by the arcs 11, 21, intersect, the doors 10, 20 would collide if not prevented from doing so. The present invention ensures that the doors 10, 20 do not collide as provided in the table provided below.

In the table, a collision is prevented while keeping in mind the prior limitation of maintaining at least one of the doors 50% open. As further illustrated in the table, an intermediate door position is provided as necessary for each mode, such as defrost, floor-defrost, etc. The intermediate position ensures that at least one of the doors is open and further ensures that the doors 10, 20 do not collide.

| Current Door Positions | | | | | Final Door Positions | | |
| --- | --- | --- | --- | --- | --- | --- | --- |
| Current Mode | Defrost Door | Panel Door | Floor Door | Next Mode | Intermediate Door Position | Defrost Door | Panel Door | Floor Door |
| Defrost | Open 100% | Close 100% | Close 100%* | Floor-Defrost | None | Open 100% | Close 100% | Open 100% |
| Defrost | Open 100% | Close 100% | Close 100%* | Floor | Floor Open 100% | Close 100%** | Close 100% | Open 100% |
| Defrost | Open 100% | Close 100% | Close 100%* | Panel-Floor | Floor Open 50% Defrost Open 50% | Close 100% | Open 50% | Open 100% |
| Defrost | Open 100% | Close 100% | Close 100%* | Panel | Defrost Open 75% Panel Open 50% | Close 100% | Open 100% | Close 100% |
| Floor-Defrost | Open 100% | Close 100% | Open 100% | Defrost | None | Open 100% | Close 100% | Close 100%* |
| Floor-Defrost | Open 100% | Close 100% | Open 100% | Floor | None | Close 100%** | Close 100% | Open 100% |
| Floor-Defrost | Open 100% | Close 100% | Open 100% | Panel-Floor | Panel Open 50% | Close 100% | Open 50% | Open 100% |
| Floor-Defrost | Open 100% | Close 100% | Open 100% | Panel | Floor Open 100% Panel Open 60% | Close 100% | Open 100% | Close 100% |
| Floor | Close 100%** | Close 100% | Open 100% | Defrost | Open Defrost 75% | Open 100% | Close 100% | Close 100% |
| Floor | Close 100% | Close 100% | Open 100% | Floor-Defrost | None | Open 100% | Close 100% | Open 100% |
| Floor | Close 100%** | Close 100% | Open 100% | Panel-Floor | Panel Open 50% | Close 100% | Open 50% | Open 100% |
| Floor | Close 100%** | Close 100% | Open 100% | Panel | Panel Open 50% | Close 100% | Open 100% | Close 100% |
| Panel-Floor | Close 100% | Open 50% | Open 100% | Defrost | Defrost Open 50% | Open 100% | Close 100% | Close 100%* |
| Panel-Floor | Close 100% | Open 50% | Open 100% | Floor-Defrost | Defrost Open 50% | Open 100% | Close 100% | Open 100% |
| Panel-Floor | Close 100% | Open 50% | Open 100% | Floor | Defrost Open 50% | Close 100%** | Close 100% | Open 100% |
| Panel-Floor | Close 100% | Open 50% | Open 100% | Panel | None | Close 100% | Open 100% | Close 100% |
| Panel | Close 100% | Open 100% | Close 100% | Defrost | Panel Open 90% Defrost Open 55% | Open 100% | Close 100% | Close 100% |
| Panel | Close 100% | Open 100% | Close 100% | Floor-Defrost | Floor Open 100% Panel Open 75% Defrost Open 50% | Open 100% | Close 100% | Open 100% |
| Panel | Close 100% | Open 100% | Close 100% | Floor | Defrost Open 50% Panel Open 90% Floor Open 50% | Close 100%** | Close 100% | Open 100% |
| Panel | Close 100% | Open 100% | Close 100% | Panel-Floor | None | Close 100% | Open 50% | Open 100% |

*In some conditions, a small Floor bleed is called for in Defrost mode
**In some conditions, a Defrost bleed is called for in Floor mode A graph is provided in FIG. 3 to illustrate a configuration where there is clearance between the doors as long as the Defrost door is open 40%, consistent with the table provided above. As illustrated in the FIG. 3, if the doors are placed in a position represented by the area above the line, a collision will occur. One skilled in the art recognizes that this chart is unique to any particular HVAC system design and does not correlate with the doors illustrated in FIG. 1. Further, no intermediate position is necessary if the panel door position begins and ends at 40% open or less.

For the sake of illustration, it is assumed that a first door 10 is the defrost mode door, a second door 20 is the panel door, and the third door 30 is the floor mode door as provided in the table. One skilled in the art recognizes this is only a convenient representation and the illustration shown here represents any door arrangement where two colliding doors are possible. The system illustrated in the figures and table provides for five primary modes, including a defrost mode, a floor-defrost mode, a floor mode, a panel-floor mode, and a panel mode. One of these modes is selected currently as illustrated in the first column. A controller 40 selects the next mode into which the system will operate, as designated in the $5^{th}$ column. In order to change to the next mode, the controller 40 determines a final position for each door, as indicated in the last column, and commands the motor to change the door positions as required.

The table illustrates the five current modes, the door positions for each of the modes, each of the next five modes, intermediate door position for the next mode, if any, and the final door position for the next mode. In the instances where one of the defrost door or panel door remain open, and the only door required to move is the floor door, there is no intermediate door position required, since there is always one door open and no possibility of the doors colliding for the particular configuration.

Looking at the table, in the case where both the defrost door and the panel door are either closed or going to be closed, the intermediate position typically includes the floor door being opened to ensure one door is open at least 50%. An example of this is shown in the third row of the table. In an alternative embodiment, an intermediate position may include both the defrost and panel doors being opened at least 25%, followed by the final position of each door. This alternative embodiment thus eliminates the need to move the floor door when it is not necessary to do so.

In a further alternative embodiment (not shown), where a door is to be closed, the floor door is always opened 50% to ensure one door is open. The door to be closed is then closed to get out of the way of the door to be opened and finally the door is opened. By doing so, one eliminates the need for the other intermediate door positions. A furtherance of this embodiment would be illustrated in row 3 of the table, if the intermediate position required the floor door to be open, then the order of closing the defrost and opening the panel doors would be irrelevant from a noise standpoint, but by closing the defrost to 50% in an intermediate position, a collision is avoided.

The table further illustrates that if the floor door is closed and one of the defrost or panel doors is to be opened and the other closed, the open door position is achieved first to ensure a door remains open at least 50%. An example of this is illustrated in the table at the 17$^{th}$ row, where while the floor door remains closed, the panel door closes to 90% to allow the defrost door to open to 55%. Then the panel door then closes while the defrost door opens completely in this example.

In a preferred embodiment, since the Cold Air bypass door (not shown) and RECIRC door (not shown) do not contribute to blocking air flow into the vehicle interior there are no rules governing them for sequencing door movement.

Although not shown here, one skilled in the art could easily adapt the method taught in the present invention for a system comprising four or more doors, or a system which has more than two doors with intersecting travel paths. Or the system could be adapted to a two door system, such as that shown in the Rena patent to eliminate the interconnection provided by the linkage and thus simplify the system shown in Rena.

One skilled in the art recognizes that the intermediate positions illustrated here may be static or dynamic. Thus, for example, at line 3 of the table, the 50% defrost door closed position is reached simultaneously while the panel door is opened 25%. The doors continue to move to the final position thereafter.

Although preferred embodiments of the present invention have been described, it will be apparent to a person skilled in the art that variations may be made to the system and method described herein without departing from the scope of the invention as defined by the following claims.

We claim:

1. In an air handling system in a motor vehicle having at least two doors to control the flow of air in the system to achieve a selected mode, a first door traveling through a first path, and a second door traveling through a second path which intersects the first path, the method comprising the steps of:
   determining a first final position for the first door and a second final position for the second door to achieve the selected mode;
   determining whether the two doors will collide when traveling to the respective final door positions;
   determining whether both doors could be closed simultaneously while rotating to the final positions; and
   maintaining a relief door at a partially open position.

2. The method according to claim 1, wherein maintaining a relief door at a partially open position comprises the step of moving one of the first and second doors to a first intermediate position, then moving the first and second doors to the final respective positions.

3. The method according to claim 2, wherein maintaining a relief door at a partially open position comprises the step of moving the first door to an intermediate position where the first door is partially open while the second door remains closed, then moving the doors to the final positions.

4. The method according to claim 1, wherein maintaining a relief door at a partially open position comprises the step of moving the first and second doors to first and second intermediate positions partially open, respectively, then moving the doors to the final positions.

5. The method according to claim 1, wherein maintaining a relief door at a partially open position comprises the step of moving a third door to an open position, then moving the first and second doors to the final positions.

6. The method according to claim 1, further comprising the step of preventing the doors from colliding.

7. The method according to claim 6, wherein upon determining two doors will collide, the step of preventing the doors from colliding comprises moving one of the doors selected from the group consisting of the first and second doors to a partially closed position out of contact with the other of the first and second doors.

8. The method according to claim 6, wherein upon determining two doors will collide, the steps of preventing the doors from colliding comprises:
   moving one of the doors selected from the first and second doors to a partially closed position;
   moving the other of the first and second doors to a partially open position; and
   moving the doors to the final positions.

9. The method according to claim 7, wherein maintaining a relief door at a partially open position comprises the step of moving one of the first and second doors to a first intermediate position, then moving the first and second doors to the final positions.

10. The method according to claim 9, wherein maintaining a relief door at a partially open position comprises the step of moving the first door to an intermediate position where the first door is partially open while the second door remains closed, then moving the doors to the final positions.

11. The method according to claim 7, wherein maintaining a relief door at a partially open position comprises the step of moving the first and second doors to first and second intermediate positions, partially open, respectively, then moving the doors to the final positions.

12. The method according to claim 7, wherein maintaining a relief door at a partially open position comprises the step of moving a third door to a partially open position, then moving the first and second doors to the final positions.

13. An air handling system for a motor vehicle having at least two doors to control the flow of air in the system to achieve a selected mode, the system comprising:
   a first door traveling through a first path, the door having a first final position to achieve a first position corresponding with the selected mode;
   a second door traveling through a second path which intersects the first path, the second door having a second final position for the second door to achieve a second position corresponding with the selected mode;
   first controller means for determining the first final position for the first door and the second final position for the second door to achieve the selected mode;
   second controller means for determining whether the two doors will collide when traveling to the respective final door positions;
   third controller means for determining whether both doors could be closed simultaneously while rotating to the final positions; and fourth controller means for maintaining a relief door at a partially open position.

14. The system according to claim 13, wherein the controller means to maintain a relief door at a partially open position comprises the first door being positioned in a first intermediate position before the first and second doors are moved to the final respective positions.

15. The system according to claim 14, wherein the controller means to maintain a relief door at a partially open position comprises the first door being positioned in a first intermediate position where the first door is partially open while the second door remains closed, then moving the doors to the final positions.

16. The method according to claim 14, wherein the controller means to maintain a relief door at a partially open position and the controller means for maintaining a relief door at a partially open position comprises the first and second doors being positioned in first and second intermediate position, respectively, where the doors are partially open, then moving the doors to the final positions.

17. The system according to claim 16, wherein upon determining two doors will collide, the third controller means prevents the doors from colliding by commanding one of the doors selected from the group consisting of the first and second doors to move to a partially closed position out of contact with the other of the first and second doors.

18. The method according to claim 13, wherein the fourth controller means for maintaining a relief door at a partially open position comprises the controller positioning a third door to an open position, then moving the first and second doors to the final positions.

19. The system according to claim 18, wherein the second controller means for determining whether the two doors will collide when traveling to the respective final door positions comprises upon determining the doors may collide, the controller positioning the first door at a first intermediate position before the first and second doors are moved to the final respective positions.

20. In an air handling system in a motor vehicle having at least two doors to control the flow of air in the system to achieve a selected mode, a first door traveling through a first path, and a second door traveling through a second path which intersects the first path, the method comprising the steps of:

determining a first final position for the first door and a second final position for the second door to achieve the selected mode;

determining whether the two doors will collide when traveling to the respective final door positions;

determining an intermediate position for the doors to prevent the doors from colliding;

determining whether both doors could be closed simultaneously while rotating to the final positions; and maintaining a relief door at a partially open position.

* * * * *